June 25, 1946.　　　　　L. F. SOBIE　　　　　2,402,851
AUTOMATIC THROTTLE CONTROL
Filed Feb. 2, 1945

Inventor
Leo F. Sobie,
By McMorrow & Berman
Attorneys

Patented June 25, 1946

2,402,851

UNITED STATES PATENT OFFICE 2,402,851

AUTOMATIC THROTTLE CONTROL

Leo F. Sobie, Jonesville, Mich.

Application February 2, 1945, Serial No. 575,909

1 Claim. (Cl. 192—.01)

This invention appertains to improvements in automatic controls for automotive vehicles of all classes powered with internal combustion engines, and has for one of its several objects to provide a control of that character, which automatically reduces the speed of the engine from an operating speed, indicated by a predetermined setting of fuel control throttle, to one of idling, upon the actuation of the clutch to bring the vehicle to a temporary halt, or a complete stop, and which likewise increases the speed of the engine to the predetermined normal operating speed, upon the release of the clutch to put the vehicle in motion, without disturbing the initial setting of the throttle, thus making possible an appreciable saving in operating costs, i. e., fuel consumption, and, particularly in the case of farm tractor operation, giving freedom to the hands of the operator for the performance of the manifold duties incident to cultivator, harrow and plow, operations.

Another object of the invention has to do with the provision of a control device of this kind, that takes the form of an extremely simple and inexpensive means which can be readily and easily incorporated with certain of the standard controls of the engine of a farm tractor, or other automotive vehicle, to interconnect the fuel throttle and clutch controls, for the performance of the aforesaid functions.

Figure 1:
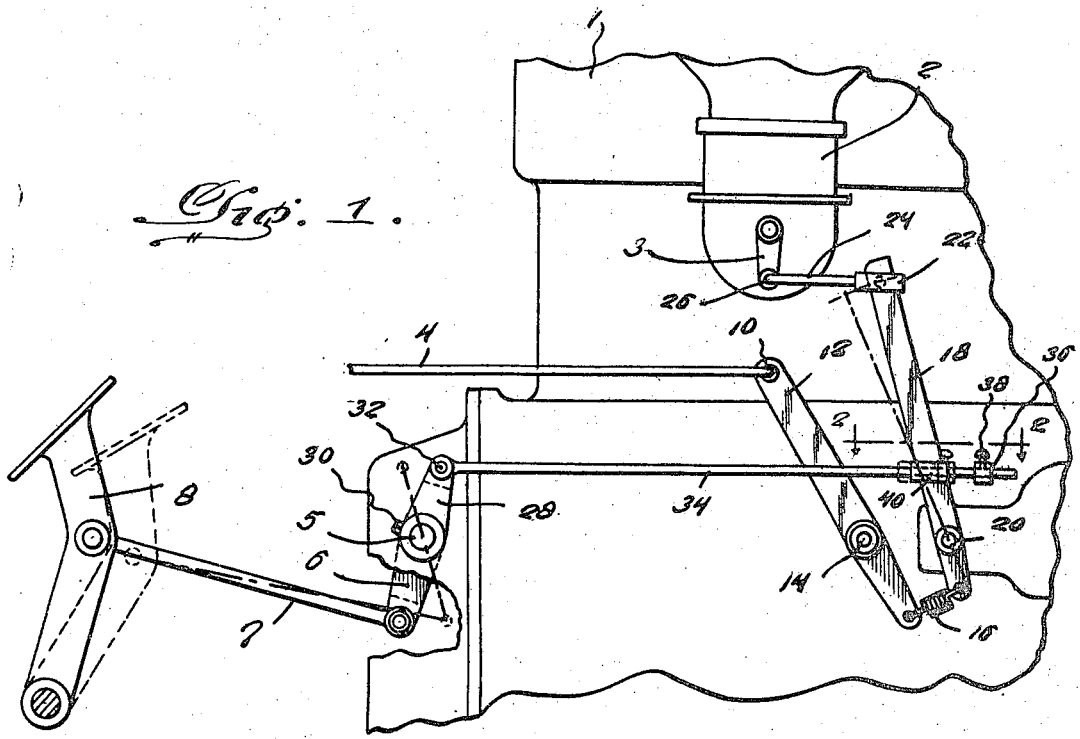
Figure 2:
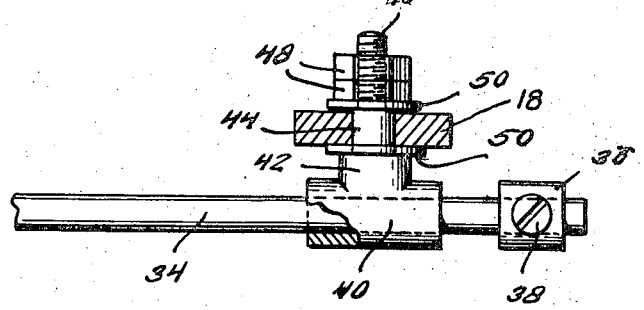

With these and other objects and advantages in view, the invention resides in the certain new and useful combination, construction, and arrangement of parts, as will be hereinafter more fully described, set forth in the appended claim, and illustrated in the accompanying drawing, in which:

Figure 1 is a fragmentary side elevation of an automotive type of internal combustion engine, showing the connective relation of the control attachment with the fuel throttle and clutch controls thereof, in accordance with the invention; and Figure 2 is an enlarged, fragmentary, sectional detail taken through line 2—2 on Figure 1, looking in the direction of the arrows.

Referring to the drawing in detail, 1, designates a tractor or other automotive type of internal combustion engine; 2, a carbureter for supplying a fuel mixture to the engine; 3, the actuating arm of the throttle valve (not shown) of the carbureter; 4, the control rod for adjusting the throttle valve of the carbureter from the operator's position on the vehicle on which the engine is mounted; 5, the clutch throw-out shaft; 6, the actuating arm secured on one end of the clutch shaft; 8, the foot pedal for actuating the clutch shaft; and 7, the connecting rod extending between the actuating arm 6 and the foot pedal 8; all of which are conventional and, of themselves, form no part of the instant invention.

In carrying out the objects and purposes of this invention, the throttle valve of the carbureter 2 is to be adjusted to an open position for the operation of the engine 1 at a desired maximum speed and, to such end, the control rod 4, instead of being directly connected to the throttle arm 3, is pivotally connected, as at 10, to the upper end of a rocker arm 12, which is pivoted at a point below its transverse center, as at 14, to the frame of the engine, and has its lower end connected by a resilient element 16, such as a coiled spring, to the like end of a second rocker arm 18; the latter also being pivoted at a point below its transverse center, as at 20, to the frame of the engine, while its upper end is, in turn, pivoted, as at 22, to one end of a relatively short connecting rod 24, extending to and having the other end thereof pivotally connected, as at 26, to the free end of the throttle arm 3, of the carbureter 2. When the control rod 4 is actuated by the operator of the vehicle, the arm 12 is rocked on its pivot 14 and its motion is transmitted by the resilient element 16 to the rocker arm 18 and through the latter, by way of the connecting rod 24 to the throttle arm 3, of the carbureter 2.

To effect the desired automatic reduction in the predetermined speed of the engine 1 to an idling speed, whenever the clutch is operated from the foot pedal 8, to bring the vehicle to a quick stop, without cutting off the ignition, or in any way disturbing the initial throttle setting from the usual throttle control, a crank arm 28 is secured, by a set screw or the like 30, on the end of the clutch shaft 5, opposite from that end on which the crank arm 6 is mounted, and is pivotally connected, as at 32, to the rearwardly directed end of a reciprocating rod 34. The forward end of the rod 34 is slidably engaged with a guide sleeve 40, forming the head end of a pivot member carried by the rocker arm 18. Adjustably secured on the forward end portion of the rod 34, by means of a set screw or the like 38, is an abutment or collar 36. The pivot member is of substantially bolt-like form and is provided with a shoulder 42, at the inner side of the cross head or sleeve 40, and an unthreaded intermediate portion 44, disposed between the shoulder 42 and an inner end portion 46, which is screw threaded to receive a pair of lock nuts 48. The unthreaded intermediate portion 44 is engaged with an aperture, formed in the rocker arm 18, and carries a pair of washers 50, one at each side of the latter. The crank arm 28 is angularly offset with respect to the crank arm 6, preferably 180 degrees therefrom, so that the motion, imparted to the clutch shaft 5 from the foot pedal 8, causes the crank arm 28 to exert a rearward pull on the reciprocating rod 34, to forcibly move the abutment 36 against the forward end of the guide sleeve 40. This movement of the abutment 36 actuates the rocker arm 18 relatively to the rocker arm 12, by reason of the resilient connection 16 therebetween, causing it to produce a rearward movement of the connecting rod 24 and the throttle arm 3. This movement of the throttle arm 3, of the carburetor 2, from its initially set position results in a reduction of fuel feed from the carburetor to an amount sufficient only to permit the engine 1 to operate at an idling speed. As soon as the pressure of the foot is relieved on the foot pedal 8, to re-engage the clutch, the accompanying motion of the clutch shaft 5 and the crank arm 28 results in a forward motion of the reciprocating rod 34 to remove the abutment 36 from its engagement with the guide sleeve 40. With this release of the guide sleeve 40, the resilient element 16 is relieved of the tension, previously imparted to it by the rocker arm 18, and it immediately contracts to return the rocker arm 18, the rod 24 and the throttle arm 3, to their respective initially set positions, when the speed of the engine 1 will increase to normal.

Having thus fully described my invention, it will be obvious to those skilled in the operation of automotive vehicles, particularly farm tractor types thereof, that the disclosed embodiment of the automatic control provides a worthwhile convenience in vehicle operation and a like saving in labor, time and expense, in that, in the case of farm tractor operations, the hands of the operator are entirely free for manipulation of the controls of an implement or machine coupled to the tractor, and fuel consumption is minimized by engine operation at an idling speed, whenever temporary stops of the vehicle are made, such stops being of a more or less frequent occurrence during cultivating, harrowing, and plowing, operations on a farm. Also, by throttling down the fuel supply to the engine, whenever the clutch is thrown to slow down, or temporarily stop, the vehicle, racing of the engine is avoided and, consequently, wear and strain on the same is minimized. Further, it is to be understood that changes in form, construction, and arrangement of parts, of the disclosed embodiment of my invention, may be resorted to, within the limits set by the scope of the appended claim.

What I claim is:

In a speed control mechanism for engines of automotive vehicles a clutch control shaft, a pedal lever controlling said shaft, a carburetor, a throttle arm adapted to regulate the flow of fluid from said carburetor, means for controlling the regulating movement of said arm, said means including two levers, one end of one lever being connected to said throttle arm, the corresponding end of the other lever being subject to the control of the operator, a spring connection between the other two ends of said levers, a crank arm on said clutch control shaft, a reciprocating rod pivotally connected to said crank arm, a crosshead slidably arranged on said rod, an adjustable stop on said rod for said crosshead and a stud on said crosshead rotatably arranged in an aperture provided in the first of said levers.

LEO F. SOBIE.